Patented Jan. 3, 1933

1,892,875

UNITED STATES PATENT OFFICE

VALENTIN DIETZ, OF FRANKFORT-ON-THE-MAIN, GERMANY, ASSIGNOR, BY MESNE ASSIGNMENTS, TO MULTIGRAPH COMPANY, OF WILMINGTON, DELAWARE, A CORPORATION OF DELAWARE

PLANOGRAPHIC PRINTING PROCESS

No Drawing.   Application filed August 1, 1930. Serial No. 472,490.

This invention relates to a planographic printing process which differs from the ordinary lithographic method in dispensing with the step of moistening the plate before each impression to prevent the adherence of ink to the non-printing regions of the plate. I accomplish the desired result by treating the image-bearing plate with a substance which causes the non-printing areas to be receptive to an ink-resisting substance and by using an ink which carries as an emulsion a substance transferable to the plate and which, when applied thereto, is ink resisting.

Furthermore, I supply, preferably in the ink itself, materials to maintain the plate constantly in condition to receive the ink-resisting substance from the ink. By putting such materials in the ink itself, I not only simplify the operation over a separate application of materials, but I aid the separation of the transferable ink-resisting substance from the ink.

I have found that I can accomplish the desired result by using an ink with glycerine or a substance having similar properties (for instance glycol and various polyhydric alcohols) and treating the plate with a suitable inorganic salt, and putting similar inorganic material into the ink. The result is that the glycerine or its equivalent and the varnish of the ink form an emulsion which the inorganic materials added to the ink tend to break down, thereby freeing the glycerine. At the same time, the action of the inorganic materials on the plate keeps it in a glycerine-receptive condition. In other words, that the plate is maintained in a condition to readily receive glycerine and the ink in a condition to readily give up glycerine, so that the glycerine constantly passes from the ink to the plate, which holds it as an ink-resisting coating over the non-printing areas. Thus, the process may go on continuously and an indefinite number of copies be obtained.

I have found that the material with which the plate is treated and that which is added to the ink may consist of a comparatively small quantity of suitable nitrate, as ammonium nitrate, though I prefer to add to this preferably, when a zinc plate is employed, a materially larger quantity of ammonium phosphate. Such materials, acting on the metallic plate, make it glycerine-receptive; at the same time such materials in the ink tend to free the glycerine therefrom, so that the glycerine passes constantly to the plate, while the plate is constantly replenished by the inorganic chemicals and thus maintains its glycerine-receptive characteristic.

Glycerine may be applied to the plate in several different ways. Thus the ammonium nitrate with or without the ammonium phosphate may be applied in the form of a solution containing glycerine as set forth below or the glycerine may be applied to the plate either as a separate operation after the salts are applied, or with the printing ink if the printing operation is begun while the plate is still wet.

I find it very satisfactory to make up a solution of about one part nitrate of ammonium, four parts phosphate of ammonium and twenty parts glycerine. Now, for treating the plate I use about one part of this solution in three parts of water, making an aqueous solution which would have about the following percentages:

|  | Per cent |
|---|---|
| Ammonium nitrate | 1 |
| Ammonium phosphate | 4 |
| Glycerine | 20 |
| Water | 75 |

After the plate has been grained, and the image applied thereto in any suitable manner, as by direct impression from a greasy crayon or from a transfer paper or photographically or in any other manner, I wash the plate with the described aqueous solution, then allow it to dry, substantially, and it is ready for use.

I find it very convenient to use the same solution of ammonium nitrate, ammonium phosphate and glycerine in the ink, using about one part of the solution to three parts of inky material, which latter may comprise about three-tenths lamp black and seven-tenths varnish; that is to say, the ink in this instance may comprise:

|  | Per cent |
|---|---|
| Ammonium nitrate | 1 |
| Ammonium phosphate | 4 |
| Glycerine | 20 |
| Varnish | 52½ |
| Lamp black | 22½ |

It is to be understood that the proportions of the parts may vary within a considerable range. When using an aluminum plate, I may dispense entirely with the phosphate, though such phosphate does no harm for an aluminum plate, and, as it is useful for a zinc plate, I prefer to employ both ammonium nitrate and ammonium phosphate, thus making the same treatment for both metals. In fact, my experience indicates that it may be used on various other plates.

When the ammonium nitrate and phosphate are both used, I find it preferable to employ a considerably larger quantity of phosphate than nitrate, but these proportions may vary within wide limits. A considerable quantity of glycerine or its equivalent should be employed both in the wash and in the ink, so as to properly start the process and to keep it continuously operative. The other ingredients of the ink may vary considerably according to circumstances. The reference to lamp black implies a black ink and for ink of other colors other materials would be used, and the proportion of coloring matter and varnish may be considerably varied.

The varnish of the ink, being largely of linseed oil, is of a greasy character and forms an emulsion with the glycerine, or its equivalent if such is employed. This emulsion is one of the important features of my invention, as it enables the glycerine to be separated from the rest of the ink and pass to the plate. This freeing of the glycerine from the ink however is materially augmented by the incorporation of the inorganic chemicals in the ink. It appears that these inorganic chemicals act in the ink as a negative catalyzer tending to break down the emulsion and making the glycerine ready to leave the ink and pass to the plate.

Tests of my treated ink indicate that the emulsion is of an unusual type, wherein a nucleus of glycerine is surrounded by a coating of oil, and that with such type of emulsion the core (that is the glycerine particle) will carry a positive charge of electricity, the oil sheath carrying a negative charge. Now, the negative ions of the incorporated inorganic salts have an attraction for the positive core of the emulsion, hence break down that emulsion, freeing the glycerine, so that it may readily leave the ink and pass to the plate. Not only do the inorganic added salts appear to aid in this manner in breaking the glycerine emulsion, but such salts themselves passing to the plate, serve to constantly replenish the plate and maintain it in a condition to receive the transferred glycerine, and thus the process may continue without interruption.

I claim:—

1. The process of printing comprising treating a plate with a solution of ammonium nitrate, ammonium phosphate and glycerine and using on such treated plate an ink containing ammonium nitrate, ammonium phosphate and glycerine.

2. The method of printing comprising washing a metallic image-bearing plate with an aqueous solution having approximately the following formula: ammonium nitrate 1%, ammonium phosphate 4%, glycerine 20%, water 75%; and printing from such plate by an ink having approximately the following formula: ammonium nitrate 1%, ammonium phosphate 4%, glycerine 20%, varnish 52½%, pigment 22½%.

3. The process of printing which includes the steps of treating a plate with a solution containing ammonium nitrate and ammonium phosphate, thereby rendering the plate glycerine-receptive, and using on such treated plate an ink containing ammonium nitrate, ammonium phosphate and glycerine.

4. The process of printing which includes the steps of treating a plate with a solution containing ammonium nitrate and ammonium phosphate, thereby rendering the plate glycerine-receptive, applying glycerine thereto and using on such treated plate an ink containing ammonium nitrate, ammonium phosphate and glycerine.

In testimony whereof, I hereunto affix my signature.

VALENTIN DIETZ.